United States Patent

Gatlin

[11] Patent Number: 5,498,707
[45] Date of Patent: * Mar. 12, 1996

[54] HYDROGEN SULFIDE CONVERTER

[76] Inventor: Larry W. Gatlin, Rte. 2, P.O. Box 181A, Hwy. 1301, Floresville, Tex. 78114

[ * ] Notice: The portion of the term of this patent subsequent to Jan. 23, 2013, has been disclaimed.

[21] Appl. No.: 239,370

[22] Filed: May 6, 1994

Related U.S. Application Data

[62] Division of Ser. No. 51,185, Apr. 22, 1993, abandoned.

[51] Int. Cl.$^6$ ............... C07H 5/04; C07H 1/00; C07C 45/00
[52] U.S. Cl. ............ 536/55.2; 536/18.7; 536/1.11; 564/483; 564/472; 564/471
[58] Field of Search ................ 536/55.2, 18.7, 536/1.11; 564/483, 472, 471, 473; 423/226, 228; 528/196, 266; 210/752, 917; 585/854; 208/674; 548/521

[56] References Cited

U.S. PATENT DOCUMENTS

| | | | |
|---|---|---|---|
| 2,390,153 | 12/1945 | Kern | 260/72 |
| 3,761,534 | 9/1973 | Sun et al. | 585/854 |
| 3,855,239 | 12/1974 | Crivello | 548/521 |
| 3,856,921 | 12/1974 | Shrier et al. | 423/228 |
| 4,112,050 | 9/1978 | Sartori et al. | 423/223 |
| 4,112,051 | 9/1978 | Sartori et al. | 423/223 |
| 4,112,052 | 9/1978 | Sartori et al. | 423/228 |
| 4,608,430 | 8/1986 | Mark et al. | 528/196 |
| 4,748,011 | 5/1988 | Baize | 423/228 |
| 4,978,512 | 12/1990 | Dillon | 423/226 |

FOREIGN PATENT DOCUMENTS

| | | |
|---|---|---|
| 8902780 | 6/1989 | WIPO . |
| 8902781 | 6/1989 | WIPO . |

*Primary Examiner*—Michael G. Wityshyn
*Assistant Examiner*—Louise N. Leary
*Attorney, Agent, or Firm*—Ross, Clapp, Korn & Montgomery

[57] ABSTRACT

A composition adapted to convert hydrogen sulfide and organic sulfides to nontoxic polymers. The compositions comprise amine resin solutions made by reacting sterically hindered amines such as selected diamines, triamines, amino alcohols, and mixtures thereof, with aldehydes, aldehyde donors, or the reaction products of lower alkanolamines and lower aldehydes. The subject compositions are preferably made by reacting the sterically hindered amines and aldehyde components in about a 1:1 molar ratio at a temperature ranging from about 110° to about 120° F. (about 43° to about 49° C.), using enough of the sterically hindered amine to produce a reaction product having a pH ranging from about 10.5 to about 12. Streams containing hydrogen sulfide or organic sulfides are preferably treated by contacting such streams with from about 2 to about 4 ppm of the amine solution of the invention per ppm of sulfide.

12 Claims, No Drawings

HYDROGEN SULFIDE CONVERTER

This application is a Divisional application of U.S. application Ser. No. 08/051185 filed Apr. 22, 1993, now abandoned.

BACKGROUND OF THE INVENTION

1. Technical Field

This invention relates to compositions useful for converting hydrogen sulfide or other organic sulfides such as mercaptans from fluid streams, and more particularly, to an amine resin solution made by reacting sterically hindered amines such as selected alkyl diamines, alkyl triamines, amino alcohols and mixtures thereof with aldehydes, aldehyde donors, or the reaction products of lower alkanolamines and lower aldehydes.

2. Prior Art

The use of lower alkanolamines and lower aldehydes in compositions for sweetening gaseous and liquid hydrocarbon streams is well known, having previously been disclosed, for example, in U.S. Pat. Nos. 4,748,011 and 4,978,512.

U.S. Pat. No. 4,748,011 discloses a method for the separation and collection of natural gas through use of a sweetening solution comprising an aldehyde or ketone, methanol, an amine inhibitor (including alkanolamines), sodium or potassium hydroxides, and isopropanol.

U.S. Pat. No. 4,978,512 discloses a method for selectively reducing the levels of hydrogen sulfide and organic sulfides present in gaseous or liquid hydrocarbon streams or mixtures thereof by contacting the streams with a composition comprising the reaction product of a lower alkanolamine with a lower aldehyde.

U.S. Pat. No. 2,390,153 discloses a process for solubilizing a water and organic solvent insoluble nitrogenous condensation product of hexamethylene diamine and formaldehyde by heating the condensation product with three times its weight of 30% aqueous formaldehyde solution, preferably in the presence of butyl alcohol, until the condensation product becomes soluble.

U.S. Pat. No. 3,856,921 discloses the removal of carbon dioxide and carbonyl sulfide from fluids by contacting the fluids with a solution of a basic salt of an alkali or alkaline earth metal and an amine.

U.S. Pat. No. 4,112,050 discloses the removal of carbon dioxide containing gases from normally gaseous mixtures by contacting the mixtures with a solution comprising a basic alkali metal salt or hydroxide and an activator comprising at least one sterically hindered amine.

U.S. Pat. No. 4,112,051 discloses the removal of acidic gases, including hydrogen sulfide, from normally gaseous mixtures by contacting the mixtures with an amine-solvent liquid absorbent comprising an amine having at least about 50 mol percent of a sterically hindered amine and a solvent for the amine mixtures which is also a physical absorbent for the acidic gases.

U.S. Pat. No. 4,112,052 discloses the removal of carbon dioxide containing gases from normally gaseous mixtures by contacting the mixtures with an aqueous amine solution wherein at least one of the amines is a sterically hindered amine.

The processes disclosed in each of U.S. Pat. Nos. 4,112,050, 4,112,051 and 4,112,052 involve the use of a regeneration step in which carbon dioxide is desorbed from the scrubbing solution.

Sartori and Savage have disclosed steric hindrance as the dominant factor giving high thermodynamic capacity and fast absorption rates at high carbon dioxide loadings in aqueous amino alcohols in "Sterically Hindered Amines for $CO_2$ Removal from Gases" in I & EC FUNDAMENTALS, Vol. 2, No. 22 (1983).

Where sterically hindered amines such as aliphatic diamines and amino alcohols have previously been used in gas sweetening to form carbonates or bicarbonates from carbon dioxide, or to form sulfides or bisulfides from hydrogen sulfide reactions, such processes have typically involved a regeneration step to recover the carbon dioxide or hydrogen sulfide. During the regeneration step, the carbon dioxide or hydrogen sulfide is liberated from the process fluid. A process and composition are therefore needed that will convert hydrogen sulfide to a stable, nontoxic and noncorrosive form without a corresponding need for regeneration of process fluids.

While the previously known hydrogen sulfide converters may theoretically require 1 to 2 ppm of converter per ppm of hydrogen sulfide in the treated fluid, amounts ranging from about 6 to 10 or more ppm of conventional converter per ppm of hydrogen sulfide are often required in actual practice because of difficulties encountered in distributing the converter evenly throughout the fluid.

Some conventional, commercially available products being marketed for use in hydrogen sulfide removal are unstable under storage and operating conditions, and can yield free formaldehyde. Products that can yield free formaldehyde are generally considered to be hazardous and environmentally unacceptable. A hydrogen sulfide and organic sulfide converter is therefore needed that is effective and economical, but less hazardous to the public and the environment.

SUMMARY OF THE INVENTION

According to the present invention, a hydrogen sulfide or organic sulfide converter is provided that comprises the reaction product of sterically hindered amines such as selected aliphatic diamines, aliphatic triamines, amino alcohols, and mixtures thereof with aldehydes, aldehyde donors, or the reaction products of lower alkanolamines and lower aldehydes to form a liquid resin which reacts effectively to convert such sulfides to a water soluble, stable complex.

According to one preferred embodiment of the invention, a hydrogen sulfide converter is provided that is made by reacting amine heads with formaldehyde.

According to another preferred embodiment of the invention, a hydrogen sulfide converter is provided that is made by reacting amine heads with a solution comprising free formaldehyde and the reaction product of a lower alkanolamine such as monoethanolamine with a lower aldehyde such as formaldehyde.

According to another preferred embodiment of the invention, a hydrogen sulfide converter is provided that is made by reacting the reaction product of amine heads and formaldehyde with the reaction product of a lower alkanolamine such as monoethanolamine and a lower aldehyde such as formaldehyde.

According to another embodiment of the invention, a sulfide converter is made by reacting amine heads with a formaldehyde donor such as hexamethylenetetramine (hexamine or HMTA) or hydantoin.

According to a preferred embodiment of the invention, the subject sulfide converter compositions have a pH ranging from about 10.5 to about 12.0.

According to another embodiment of the invention, a composition is provided in which the hydrogen sulfide or organic sulfide converter of the invention further comprises a solvent adapted to reduce foaming and prevent cross-linking. Preferred solvents include methanol, methoxymethanol, water, and mixtures thereof.

According to another embodiment of the invention, a composition is provided in which the hydrogen sulfide or organic sulfide converter of the invention is diluted with methanol, methoxymethanol, mixtures of methanol and methoxymethanol, or water, and optionally, a minor amount of a surfactant.

According to another embodiment of the invention, a method is provided for making a hydrogen sulfide converter by reacting amine heads and formaldehyde under vacuum in about a 1:1 molar ratio at a temperature ranging from about 110 to about 120 degrees F. (about 43 to about 49 degrees C.), using enough excess amine heads that the reaction product has a pH ranging from about 10.5 to about 12.

According to another embodiment of the invention, a method is provided for removing hydrogen sulfide from gaseous and liquid hydrocarbon streams by contacting such streams with a solution comprising the hydrogen sulfide converter of the invention.

According to another embodiment of the invention, a method is provided for removing sulfides from aqueous systems by contacting the aqueous fluid in said systems with the composition of the invention.

Use of the composition and methods disclosed herein allows direct conversion of hydrogen sulfide to a stable form without liberating the hydrogen sulfide during regeneration in the manner experienced with prior art compositions and methods. The complexes produced by reacting the compositions disclosed herein with hydrogen sulfide do not have to be removed from the process fluids for regeneration. The complexes produced hereby are largely water soluble, and are therefore easily separated from gaseous or liquid hydrocarbon streams.

DESCRIPTION OF THE PREFERRED EMBODIMENTS

I have found that compositions which convert hydrogen sulfide or other organic sulfides to water soluble, nontoxic, stable complexes can be made by reacting under controlled conditions solutions of sterically hindered amines comprising amine heads, selected aliphatic diamines, aliphatic triamines, amino alcohols, and mixtures thereof, with aldehydes, aldehyde donors, or the reaction products of lower alkanolamines and lower aldehydes. The complexes thus formed are easily separated from gaseous or liquid hydrocarbons.

Use of the compositions disclosed herein is more efficient than using conventional materials, with significantly lower concentrations of the converter being required (such as from about 2 to 3 times less) in actual practice to achieve the same degree of sulfide conversion. Typical application ratios for the compositions disclosed herein are from about 2 to about 4 ppm of converter per ppm of hydrogen sulfide in the treated fluid. This improved conversion allows more complete removal of hydrogen sulfide at a minimal cost, often without the need for a scrubber tower, which further reduces related equipment costs.

Generally speaking, the compositions of the invention are preferably made by reacting a solution comprising free aldehyde and the reaction product of a lower aldehyde and a lower alkanolamine either with a solution comprising a sterically hindered amine, preferably amine heads, or with an activator comprising the reaction product of a amine heads and formaldehyde. A particularly preferred lower aldehyde for use in making the subject compositions is formaldehyde. A particularly preferred lower alkanolamine for use in making the subject compositions is monoethanolamine.

As used herein, the term "amine heads" refers to an unrefined mixture of alkyl diamines that comprise from 4 to 6 carbon atoms. Examples of alkyl diamines typically found in amine heads include aminomethylcyclopentylamine; 1,2-cyclohexanediamine (1,2-diaminocyclohexane); 1,5-pentanediamine, 2-methyl 1,6-hexanediamine; 1H-azepine, hexahydro; and 1,4-butanediamine. Amine heads is commercially available from Monsanto Company and DuPont as a byproduct in the manufacture of hexamethylenediamine.

Although amine heads is a convenient and useful source of aliphatic diamines suitable for use in making the compositions of the invention, it should be understood that other diamines or triamines not present in amine heads can likewise be used within the scope of the invention. Examples of other aliphatic diamines and triamines that can be satisfactorily used in making the subject compositions include 1,4-diaminocyclohexane and bis-hexamethylenetriamine.

One particularly preferred composition of the invention is made by reacting amine heads with formaldehyde.

Another preferred composition of the invention is made by reacting amine heads with a solution of free formaldehyde and the reaction product of monoethanolamine and formaldehyde. Another preferred composition of the invention is made by reacting the reaction product of monoethanolamine and formaldehyde with an activator comprising the reaction product of amine heads and formaldehyde. An amine material that can be effectively substituted for monoethanolamine in making the foregoing compositions of the invention is available commercially from The Dow Chemical Company under the tradename Organic Amine 70.

Organic Amine 70 is a black, viscous liquid comprising about 5 weight percent aminoethylethanolamine, about 55 weight percent Sym-dihydroxyethylethylenediamine, about 37 weight percent Unsym-dihydroxyethylethylenediamine, about 3 weight percent trihydroxyethylethylenediamine, and a trace of tetrahydroxyethylethylenediamine.

Another composition of the invention comprises the reaction product of amine heads with a formaldehyde donor such as HMTA or hydantoin.

Other materials believed to be satisfactory for use in place of amine heads in making the compositions of the invention and for use in the methods of the invention include, for example, methyl-diethanolamine; 2-[ (hydroxymethyl)amino]ethanol, 2-amino-2-methyl-1-propanol; methylethanol amine; 2-methyl-1-amino ethanol; 2-ethyl-1-amino ethanol; 2-tertiary butylamino ethanol, 2-tertiary butylamino ethanol; 2-amino-2-ethyl-1,3-propanediol; 2-[(hydroxymethyl)amino]-2-methyl propanol; hydantoin; 5,5-dimethyl-1-hydantoin; acetaldehyde ammonia; acetalsoxime; 2-amino-2-hydroxymethanol, 1-3-propanediol; 2-amino-1, 3-propanediol; 2-amino-2-methyl- 1,3-propanediol; the reaction product of methyl pyrol and hydroxylamine; choline; and amino-spirocyclic borate esters derived by reacting boric acid with glycols, amines and amides.

Components that may be reacted with or sterically hindered amines comprising amine heads, selected aliphatic diamines, aliphatic triamines,—or amino alcohols to produce compositions of the invention include, for example, aldehydes, aldehyde donors, the reaction products of lower alkanolamines and lower aldehydes, and the family of D aldoses having from 3 to 6 carbon atoms.

Aldehydes believed to be useful for making the subject compositions are preferably selected from the group consisting of monoaldehydes and dialdehydes having from 1 to 6 carbon atoms, and mixtures thereof, with formaldehyde, acetaldehyde, glycolaldehyde, hydroxymethyl glyceraldehyde, glyoxal, and methyl formcel (a hemi-acetal, 55 percent formaldehyde solution in methanol and methoxy-methanol or water) being particularly preferred.

Aldehyde donors believed useful in making the compositions of the invention are preferably selected from the group consisting of hydantoin; hexamethylenetetramine; hexamethylolmelamine; 2-[ (hydroxymethyl)amino] ethanol; 5,5-dimethylhydantoin; tris(hydroxymethyl)nitromethane; 2-nitro-2-methyl-1-propanol; 2-nitro-2-ethyl-1, 3-propanediol; 2-nitro-1-butanol; and acetaldehyde ammonia.

D-aldoses having from 3 to 6 carbon atoms believed useful in making the compositions of the invention are preferably selected from the group consisting of D-Glyceraldehyde; D-Erythrose; D-Ribose; D-Arabinose; D-Allose; D-Altrose; D-Glucose; D-Mannose; D-Threose; D-Xylose; D-Lyxose; D-Gulose; D-Idose; D-Galactose; D-Talose; and mixtures thereof.

The use of solvent systems comprising up to about 90 weight percent solvent in conjunction with the inventive compositions made by reacting amine heads with lower aldehydes such as formaldehyde can also be desirable. The presence of solvents in the reaction mixture during the reaction of amine heads and formaldehyde, for example, can reduce the formation of undesirable byproducts and crosslinked polymer residues. Preferred solvents for use in the reaction system are methanol, methoxymethanol, diglymine, and mixtures thereof.

Solvents can also be useful for controlling excessive foaming that might otherwise occur in scrubber or tower applications due to the inherent surfactive properties of the subject compositions, particularly those made by reacting amine heads with formaldehyde.

The solvents identified below are believed to be exemplary of those solvents that can enhance the efficiency of the subject compositions in various applications: water or methanol, or mixtures thereof; methoxymethanol or mixtures of methoxymethanol and methanol; dicyclopentadiene; formamide; solutions of oxo-alcohols and oxo-alcohol ethers; disulfide oil; glycols; excess polyfunctional amines such as diamines and triamines; terpenes; cyclohexene; d-limonene; m-pyrol; diglymine; neopentyl glycol; glycerin diglymine; and neopentyl glycol and glycerin or glycerol. A solvent such as Texaco Amine C-6 (comprising morpholine residues) can be used in place of monoethanolamine to suppress cross-linking, but does not remove free formaldehyde.

The use of catalysts in the compositions of the invention can be desirable for extending their useful conversion life, for improving the conversion of organic sulfides to a less noxious form, and for converting low molecular weight sulfide reaction products to higher oxidative forms. In most cases the use of up to about 5 weight percent catalyst in the reactive mixtures by which the subject compositions are produced is believed to be satisfactory for achieving the purposes described above.

Catalysts believed to be satisfactory for use in making the compositions of the invention include, for example, potassium or sodium borohydride in aqueous alkaline solution; catechol borane; ammonia; thiourea; aluminum chlorohydrate; aluminum hydroxide; urea; iron hydroxide; iron chelates; tris(hydroxymethyl)nitromethane; brass or copper; acetylacetonate chelate of titanium; sodium percarbonate; erythorbic acid; lactone; serine; sodium methylate; and the sodium salt of lauryl sarcosinate. Particularly preferred catalysts for use in the subject compositions are amine chelated brass, tris(hydroxymethyl)nitromethane, catechol borane, and sodium salt of lauryl sarcosinate.

According to the preferred method of the invention, the sterically hindered amine and aldehyde components of the subject compositions are reacted under vacuum in about a 1:1 molar ratio at a temperature ranging from about 110 to about 120 degrees F. (about 43 to about 49 degrees C.). Although a 1:1 molar ratio is not required stoichiometrically for reacting the sterically hindered amine and aldehyde components, the use of excess sterically hindered amine component (such as amine heads) helps in reacting any free formaldehyde that may be present, and helps in controlling the pH of the reaction product to a level of from about 10.5 to about 12. At lower pH levels, the reaction products tend to be insoluble, and therefore less satisfactory for achieving dispersion throughout the treated fluid. When amine heads is used in producing the compositions of the invention, the product produced is black and viscous, comprising relatively little insoluble polymer. Using only 1,2 diaminocyclohexane in place of amine heads will generally yield a clear to white resin.

For compositions made by reacting amine heads directly with a lower aldehyde, with a solution of free formaldehyde and the reaction product of a lower alkanolamine with formaldehyde, or with a formaldehyde donor, the reactions can be run in a solvent system in which the reactants are diluted in methanol, methoxymethanol, mixtures of methanol and methoxymethanol, water, or another similarly effective solvent. For compositions made by reacting an activator such as the reaction product of amine heads and formaldehyde with a reaction product such as that of monoethanolamine and formaldehyde, solvent dilution will desirably occur following production of the converter. The use of methanol, methyoxymethanol, or mixtures thereof as a solvent is preferred when making the compositions of the invention with an activator. If water is used as the solvent in the manufacture of compositions using such an activator, undesirable gels may form in the reaction product.

The addition of a minor amount, generally less than about 5% by weight of the converter, of a commercially available surfactant to the compositions of the invention can also enhance dispersion and conversion efficiency, particularly in low velocity systems. Surfactants that function satisfactorily in the compositions of the invention can be selected from the group consisting of nonionic, cationic, anionic or amphoteric surfactants. A preferred nonionic surfactant for use in the compositions of the invention is Texaco Surfonic N-150. A preferred cationic surfactant for use in the compositions of the invention is cocoamidopropyldimethylbenzyl quaternary ammonium chloride. A preferred anionic surfactant for use in the compositions of the invention is Stepan CA-207. A preferred amphoteric surfactant for use in the compositions of the invention is cocoamidopropyldimethyl betaine.

The compositions of the invention are preferably used by injecting them directly into lines through which gaseous or liquid fluids comprising the hydrogen sulfide or organic sulfides to be converted are flowing. If desired, a plurality of spaced-apart injection points can be utilized to enhance dispersion and maximize conversion of the sulfides. Alternatively, the subject converters can be utilized in conventional scrubbing equipment if desired. For tower applications, water can be used as a solvent to weight the converter and thereby help in reducing foaming that might otherwise occur.

EXAMPLE 1

A composition useful for converting hydrogen sulfide and organic sulfides in aqueous or hydrocarbon-containing fluid streams to water soluble, nontoxic polymers is produced by charging about 695 grams of amine heads into a 1000 ml filter flask equipped for slight vacuum, and thereafter slowly adding about 405 grams of a mixture of a solution comprising 37 percent formaldehyde and 7 weight percent methanol. The addition is controlled to allow a maximum temperature of 120 degrees F. or external cooling is provided to control temperature. The reaction product is a black, viscous liquid and contains less than about 3 weight percent insoluble polymer.

EXAMPLE 2

A composition useful for converting hydrogen sulfide and organic sulfides in aqueous or hydrocarbon-containing fluid streams to water soluble, nontoxic polymers is produced in two stages. In the first stage, about 40 weight percent of a mixture of 85 weight percent monoethanolamine and 15 weight percent water is added to about 60 weight percent of a mixture of 37 weight percent formaldehyde and 7 weight percent methanol in water. In the second stage, the first stage reaction product is titrated with amine heads obtained from Monsanto Chemical to a pH ranging between about 10.5 and about 12.0, or until polymerization occurs and formaldehyde and formaldehyde donor disappears. This occurs when about 14 weight percent amine heads is added to about 86 weight percent of the first stage reaction product. A black liquid product is produced that contains some insoluble polymer, which may precipitate.

EXAMPLE 3

The product produced by the two-stage reaction of Example 2 is diluted by further mixing with about 5 weight percent of a surfactant, Texaco Surfonic N-150, and an amount of methanol approximately equal in weight to the weight of the product of Example 1.

EXAMPLE 4

The product produced by the two-stage reaction of Example 2 is diluted by further mixing with about 5 weight percent of a surfactant, cocoamidopropyldimethylbenzyl quaternary ammonium chloride, and an amount of water approximately equal in weight to the weight of the product of Example 1.

EXAMPLE 5

Fifteen parts of water are charged to a reaction vessel. Ten parts by weight of hexamethylenetetramine are added slowly with mixing. Alternatively, this aldehyde donor can be purchased as an aqueous solution of about 40 weight percent hexamine. Fifty parts of methanol are then charged to the reaction vessel. Under vacuum and with cooling, 25 parts of amine heads are slowly added to the solution with vigorous agitation. The reaction is allowed to proceed about one hour and until the solution cools to ambient temperature.

EXAMPLE 6

Forty-five parts of the product of Example 2 are charged to a reaction vessel with 50 parts of methanol. With cooling and under vacuum, 5 parts of the product of Example 1 are added rapidly with vigorous agitation and mixing is continued until no polymer residue exists.

EXAMPLE 7

A two stage reaction is performed by first reacting about 54 parts Angus Amine AX (a mixture of 2-Amino-2-methyl-1-propanol and 2-Amino-2-Ethyl-1,3-propanediol) with a slow addition of 46 parts of 37% formaldehyde under vacuum with cooling. In the second stage, 82 parts of the first stage reaction product is reacted with 18 parts of Angus Amine AX.

EXAMPLE 8

The product produced by the two stage reaction of Example 7 is titrated with amine heads to a pH of 10.5 to 12.0 or until polymerization occurs and formaldehyde and formaldehyde donor disappears. This occurs when about 4.4 parts of amine heads are added to 54 parts of the reaction product of Example 7 and 41.6 parts of methanol under vacuum with cooling.

EXAMPLE 9

A product is produced as in Example 5 except that hydantoin is used as the formaldehyde donor in place of hexamethylenetetramine.

EXAMPLE 10

A two stage reaction is performed in which 80 parts of Amine AX is first charged to a reactor and heated to about 180 degrees F. Twenty parts of boric acid is slowly added. The reaction is maintained at a temperature between 180 and 250 degrees F. until all the boric acid is dissolved, and then continued for 2 to 8 hours until the amino-spirocyclic borate ester is formed. In the second stage, the reaction is cooled to about 100 degrees, and with cooling and under vacuum, 71 parts of the first stage reaction product are slowly titrated with 29 parts of amine heads until the solution is homogeneous and has a pH between about 10.5 and 12.0.

EXAMPLE 11

In a two stage reaction, a crude aldose mixture is produced by slowly adding to 70 parts of 37% formaldehyde by weight containing 7 weight percent methanol, 30 parts of 50 weight percent sodium hydroxide in water, allowing the temperature to increase to 190 to 210 degrees F. Addition is done slowly and the exotherm is controlled so that the solution remains colorless. A rapid addition causes all the formaldehyde to be consumed and a purple black color results. The crude aldose mixture will contain free unreacted formaldehyde if the first stage reaction remains colorless. The reaction is cooled. The reaction mass has a pH of greater than 11.5. About 100 parts of hydrochloric acid (30% by weight) is slowly added until the pH is between about 6.0 and 7.0. Excess water can be removed and precipitated. Sodium chloride is removed by filtration, although this is not necessary except to concentrate the final product. In the second stage, the first stage aldose mixture is titrated with amine heads to a pH of 10.5 to 12.0. This occurs when about 25 parts of amine heads are added to 200 parts of the first stage reaction product in dilute form. The product comprises about 22 weight percent active component in salt (NaCl) aqueous solution.

EXAMPLE 12

A product is produced as in Example 11, except that glyceraldehyde is substituted for the crude aldose mixture (first stage).

EXAMPLE 13

A product is produced as in Example 11, except that glycolaldehyde is substituted for the first stage aldose mixture.

EXAMPLE 14

A product is produced as in Example 11, except that calcium hydroxide (lime) is used in place of sodium hydroxide.

EXAMPLE 15

A product is produced as in Example 11, except that lithium hydroxide is used in place of sodium hydroxide.

EXAMPLE 16

A product is produced as in Example 5, except that 5,5 Dimethylhydantoin is used as the formaldehyde donor in place of hexamethylenetetramine.

EXAMPLE 17

Forty-five parts of the product produced as in Example 5 are charged to a reaction vessel with 50 parts of methanol. With cooling and under vacuum, 5 parts of a product produced as in Example 1 are added rapidly with vigorous agitation and continued mixing until no polymer residue remains.

EXAMPLE 18

In a two stage reaction, 24.8 parts of boric acid are slowly added to 100 parts of glycerin. The solution is heated to 200 to 220 degrees F. and mixed until the boric acid dissolves, after which the reaction continues until the acidity increases. In the second stage, 46 parts of amine heads are added to the top of the solution of the first stage without mixing. This mixture is allowed to sit undisturbed for 2 to 4 hours. A further chemical reaction slowly takes place, and then the solution is mixed.

EXAMPLE 19

A product is produced as in Example 5, except amine heads are replaced by a product as produced in Example 18, an amino-spirocyclic ester.

EXAMPLE 20

Forty-five parts of water are charged to a reactor. With mixing, 5 parts of sodium chloride are added, and mixing continues until the sodium chloride is dissolved. To this mixture are added 25 parts of a solution containing 40 parts hexamethylenetetramine in 60 parts water with mixing. Under vacuum with cooling, 25 parts of amine heads are slowly added and mixed until no polymer is present.

Hydrogen sulfide scavenging tests were done on the compositions produced according to the present invention, and on conventional, commercially available compositions in order to determine their comparative effectiveness. The scavenging tests were performed by flowing a standard hydrogen sulfide gas solution at a defined concentration in methane or nitrogen through a distilled water solution containing 1000 ppm of the particular hydrogen sulfide converter then being tested. Hydrogen sulfide levels were measured using Sensidyne Gastec tubes. The testing procedure was conducted as follows:

a. In a 500 ml volumetric flask, 0.5 mls of a test sample of a hydrogen sulfide converter was diluted to volume with distilled water and mixed by inversion 20 times.

b. The diluted test sample was transferred to an Erlenmeyer flask having a two-hole rubber stopper.

c. The standard hydrogen sulfide gas solution was metered into the flask through a gas dispersion tube extending well into the diluted test sample.

d. Gas bubbled upward through the test sample was recovered from the flask through a shorter glass tube above the surface of the test sample and transferred through flexible tubing into a Sensidyne Gastec tube or a Texas Analytical hydrogen sulfide monitor.

e. Measurements were recorded for the time of absorption from 0 to 2 or 4 ppm hydrogen sulfide, for the hydrogen sulfide level when the test stopped, for the time of first odor detection and the hydrogen sulfide concentration at that time; and for the level of forming.

The test data for the various hydrogen sulfide converters tested in the manner described above is set forth in the tables below:

TABLE I

H$_2$S Scavenging Tests

| Converter | Time[1] (min.) | H$_2$S[2] (ppm) | Time[3] (min.) | H$_2$S[4] (ppm) | Foaming |
|---|---|---|---|---|---|
| Commercial H$_2$S Scavenger | 13 | 4.1 | 3½ | 0.6 | slight |
| Commercial H$_2$S Scavenger | 13.8 | 4.1 | 4⅙ | 0.6 | slight |
| Triazine & Diamine | 11.5 | 3.75 | 2¾ | 0.6 | good |
| Triazine & Amino Alcohol | 9 | 3.75 | 2⅓ | 0.6 | slight |
| Reaction product of Methylolated Amine & Amino Alcohol | 12 | 3.75 | 5 | 0.6 | fair |
| Reaction product of Amino Alcohol & Diamine | 15 | 3.75 | 6 | 0.6 | strong |
| 50% solution of Example 2 in Methanol | 16 | 4.1 | 5¾ | 0.6 | very strong |
| 50% solution of Example 3 in Methanol and surfactant activator | 18 | 4.1 | 7½ | 0.6 | excessive |
| Amino alcohol Angus Amine AX (sterically hindered Amine) | 25 | 4.1 | ½ 2¾ | trace 0.6 | good |
| Sterically hindered Amine MDEA | 15 | 4.1 | ½ 4¾ | trace 0.6 | good |

TABLE I-continued

$H_2S$ Scavenging Tests

| Converter | Time[1] (min.) | $H_2S$[2] (ppm) | Time[3] (min.) | $H_2S$[4] (ppm) | Foaming |
|---|---|---|---|---|---|
| 70% of (9) in methanol | 19 | 4.1 | ½ 2 | trace 0.6 | fair |

[1]Time of absorption from 0 to ppm $H_2S$
[2]Ppm of $H_2S$ when test stopped. Initial $H_2S = 0$
[3]Time until odor first noticed
[4]Ppm of $H_2S$ when odor first noticed

TABLE II

$H_2S$ Tests[5]

| Converter | Minutes to 2.0 ppm $H_2S$ | Foaming |
|---|---|---|
| Formaldehyde, MEA Polymer | 20 | No |
| Competitive triazine | 20 | No |
| Example 2 50% in methanol | 24 | Excellent |
| Boric Acid/MEA RXN Produced | 3.5 | No |
| Example 5, Amine M I | 45.5 (1.25) | Light |
| Example 5, Amine D | 37 | Light |
| Example 5, Amine M II | 50 | Light |
| Example 18 | 10 | Very light |
| Example 1, then 2 | >14 | Foamed out of vessel |
| Example 20, Amine M I | 70 | Very light |
| Example 20, Amine D | 42 | Very light |
| Example 20, Amine M II | 53 | Very light |
| Example 20, with Example/8 | 7.5 | No |
| 2-(hydroxymethylamino) ethanol | 23 | No |
| Hydantoin | 0 | Light |
| Example 5, with hydantoin for HMTA & Amine D | 23 | Fair, insoluble polymer formed |
| Example 5 with hydantoin for HMTA & Amine M I | 38.5 | Good, insoluble polymer formed |
| Example 5, with hydantoin for HMTA & Amine M II | 28 | Fair, insoluble polymer formed |
| Example 20, with hydantoin for HMTA & Amine M I | 51 | Fair |
| Example 20, with hydantoin for HMTA & Amine D | 30 | Light to fair |
| Example 20, with hydantoin for HMTA & Amine M II | 36 | Light to fair |
| Commercial production of Example 20 | 40.5 (0.8 ppm) $H_2S$ Extrapolates to about 70 min. | Light |

[5]Test gas; 60 ppm $H_2S$ in nitrogen.

The compositions of the invention tend to create more intimate contact and more complete dispersion than conventional scavengers when used in low velocity systems. The improved dispersion achieved through use of the compositions disclosed herein is believed to be attributable to the surfactive, surface tension reducing property that is inherent in the reaction product of amine heads with formaldehyde. The foaming ability of the invention increases the efficiency of the scavenger from about 2 to about 10 times over what would be experienced with a non-foaming converter or scavenger.

The higher efficiency achieved by using the compositions of the invention means that a significantly lower concentration of the treating fluid is required to achieve the same degree of reduction of hydrogen sulfide concentration in treated fluid as would be experienced using compositions disclosed in the prior art. Commercially available hydrogen sulfide scavenging compositions may have a theoretical treating rate of 1–2 ppm per ppm of hydrogen sulfide, but in the field, the use of from about 6–9 ppm is commonly needed because of poor distribution of the treating fluid throughout the treated fluid. By using the reaction products of this invention, which are stronger absorbers and have higher surface activity, as shown in Table III, and in which surface activity is accelerated by solvent dilution and use of activators, reaction ratios typically range from about 2 to about 3 times less than are required with other commercially available materials. Using the present invention, reaction ratios for the compositions of the invention typically range up to about 4 ppm, and preferably from about 2 to about 4 ppm, per ppm of hydrogen sulfide in the treated stream.

TABLE III

Test I

| Converter[6] | Time[7] (min.) | Foaming |
|---|---|---|
| Competitive Triazine | 12 | None |
| Example 1, Amine D, 10% in Methanol | 6.5 | ¾", dense, voluminous |
| Example 1, Amine M I, 10% in Methanol | 9.5 | 3", dense, voluminous |
| Example 1, Amino D, 50% in Methanol | 10 (0.25 ppm) $H_2S$ | very dense foam, foams out of vessel |
| Example 2 | 26 | 3" |
| Example 2, 50% in Methanol | 16 | 2½" |

Test II

| Converter[8] | Time (Min.) | Foaming |
|---|---|---|
| Competitive Triazine | 49 | Almost none |
| Example 1, Amine D, 50% in Methanol | 77.5 | Dense, voluminous |
| Example 1, Amine M I, 50% in Methanol | 116 | Excellent, 1500 mls expands to 4000 mls of foam and liquid |

[6]Standard Test Cell (1000 ml); 500 ml of test solution with 1000 ppm Converter; $H_2S$ concentration is 110 ppm in nitrogen.
[7]Time to 2 ppm $H_2S$
[8]Large Cell (4000 ml); same parameters except 1500 mls. test solution.

Test I shows the effectiveness of greater absorption and conversion of a 10% solution of the invention versus a competitive converter. Test II, in the large cell, illustrates the foaming, surfactive properties of the invention. The foam expansion shows 2.4 times higher effectiveness over a competitive triazine even in a 50% solution.

Use of the inventions disclosed herein can in many cases provide effective sulfide conversion by in-line injection without the use of scrubbing equipment otherwise needed with conventional compositions, thereby reducing capital equipment costs. The invention disclosed herein can, however, be used to treat gaseous hydrocarbon streams by means of a conventional scrubber or column in which the gas is bubbled upwardly through the subject compositions. Alternatively, the compositions of the invention can be injected into liquid or gaseous hydrocarbon streams, or into aqueous streams, to remove hydrogen sulfide or other organic sulfides such as methyl mercaptan, ethyl mercaptan, propyl mercaptan, or butyl mercaptan. These organic sulfides are converted through use of the compositions and methods disclosed herein to mercapto-amino polymers.

Other alterations and modifications of the invention will become apparent to those of ordinary skill in the art upon reading this disclosure, and it is intended that the scope of the invention disclosed herein be limited only by the broadest interpretation of the appended claims to which the inventor may be legally entitled.

I claim:

1. A composition useful for converting hydrogen sulfide and organic sulfides in aqueous or hydrocarbon-containing liquid or gaseous streams to water soluble, nontoxic polymers, the composition comprising the reaction product of: a first component comprising sterically hindered alkyl diamines selected from the group consisting of aminomethylcyclopentylamine; 1,2-cyclohexanediamine; 1,5-pentanediamine,2-methyl; 1,6-hexanediamine; 1H-azepine, hexahydro; 1,4-butanediamine; and mixtures thereof; and a second component comprising an aldehyde donor selected from the group consisting of hydantoin; hexamethylenetetramine; hexamethylolmelamine; 2-ethanol; 5,5-dimethylhydantoin; tris(hydroxymethyl)nitromethane; 2-nitro-2-methyl-1-propanol; 2-nitro- 2-ethyl-1,3-propanediol; 2-nitro-1-butanol; and acetaldehyde ammonia.

2. The composition of claim 1 wherein the second component comprises hydantoin.

3. The composition of claim 1 wherein the second component comprises hexamethylenetetramine.

4. The composition of claim 1 wherein the second component comprises 5,5-dimethylhydantoin.

5. The composition of claim 1, when reacted in a system comprising up to about 5 weight percent of a surfactant.

6. The composition of claim 1, when reacted in a system comprising up to about 90 weight percent of a solvent comprising a lower alcohol.

7. The composition of claim 6 wherein the solvent is selected from the group consisting of methanol, methanol and water, methoxymethanol, diglymine, and mixtures thereof.

8. The composition of claim 7 wherein the solvent is selected from the group consisting of methanol and mixtures of methanol and water.

9. The reaction product of claim 1 solubilized in amine heads.

10. A composition useful for converting hydrogen sulfide and organic sulfides in aqueous or hydrocarbon-containing liquid or gaseous streams to water soluble, nontoxic polymers, the composition being made by reacting sterically hindered alkyl diamines selected from the group consisting of aminomethylcyclopentylamine; 1,2-cyclohexanediamine; 1,5-pentanediamine, 2-methyl; 1,6-hexanediamine; 1H-azepine, hexahydro; 1,4-butanediamine; and mixtures thereof; with an aidehyde donor selected from the group consisting of hexamethylenetetramine and hydantoin under vacuum in about a 1:1 molar ratio at a temperature ranging from about 110° F. to about 120° F., wherein the amount of sterically hindered alkyl diamines reacted is sufficient to produce a reaction product having a pH ranging from about 10.5 to about 12.

11. The composition of claim 10 wherein the aldehyde donor is hexamethylenetetramine.

12. The composition of claim 10 wherein the aldehyde donor is hydantoin.

* * * * *

UNITED STATES PATENT AND TRADEMARK OFFICE
CERTIFICATE OF CORRECTION

PATENT NO. : 5,498,707
DATED : March 12, 1996
INVENTOR(S) : Larry W. Gatlin It is certified that error appears in the above-identified patent and that said Letters Patent is hereby corrected as shown below:

COLUMN 13, LINE 17

After "hexamethylolmelamine; 2-" insert —[(hydroxymethyl) amino]— before "ethanol"

Signed and Sealed this

Tenth Day of September, 1996

Attest:

BRUCE LEHMAN

Attesting Officer     Commissioner of Patents and Trademarks